(12) United States Patent
Murai et al.

(10) Patent No.: US 10,415,705 B2
(45) Date of Patent: Sep. 17, 2019

(54) SEAL STRUCTURE AND MOTOR WITH REDUCTION GEAR

(71) Applicant: MABUCHI MOTOR CO., LTD., Chiba (JP)

(72) Inventors: Goushi Murai, Saitama (JP); Junya Kurata, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 1 day.

(21) Appl. No.: 15/696,381

(22) Filed: Sep. 6, 2017

(65) Prior Publication Data

US 2018/0066756 A1 Mar. 8, 2018

(30) Foreign Application Priority Data

Sep. 7, 2016 (JP) .................................. 2016-174357

(51) Int. Cl.
| | |
|---|---|
| *F16J 15/06* | (2006.01) |
| *F16J 15/02* | (2006.01) |
| *E05F 15/697* | (2015.01) |

(52) U.S. Cl.
CPC .......... *F16J 15/062* (2013.01); *F16J 15/022* (2013.01); *F16J 15/061* (2013.01); *E05F 15/697* (2015.01); *E05Y 2201/11* (2013.01); *E05Y 2800/12* (2013.01); *E05Y 2900/55* (2013.01)

(58) Field of Classification Search
CPC ........ F16J 15/062; F16J 15/022; F16J 15/061; E05F 15/697; E05Y 2201/11; E05Y 2800/12; E05Y 2900/55
See application file for complete search history.

(56) References Cited

U.S. PATENT DOCUMENTS 4,604,907 A * 8/1986 Morishita ............... F02N 15/00
277/420

FOREIGN PATENT DOCUMENTS

| DE | 19606532 A1 | 8/1997 |
|---|---|---|
| JP | 2012-229724 A | 11/2012 |
| JP | 5334722 B2 | 11/2013 |

* cited by examiner

*Primary Examiner* — Gilbert Y Lee
(74) *Attorney, Agent, or Firm* — Hauptman Ham, LLP (57) ABSTRACT

A seal structure seals between a cover which closes an opening of a case for housing a part and the case by a sealing member. The cover is provided with an annular recessed portion attached to an end of a peripheral wall forming the opening of the case and a plurality of through-holes penetrating a bottom portion of the recessed portion and spaced apart from each other in a circumferential direction. The sealing member is formed integrally with the cover. The sealing member is integrally provided with a protrusion protruding from a bottom portion over an entire circumference in the recessed portion and an anchor portion engaged with each of the through-holes to fix the sealing member to the cover. Between at least the anchor portions in the recessed portion, a projecting portion for closing the gap between the protrusion and an inner wall of the recessed portion is provided.

7 Claims, 5 Drawing Sheets

SEAL STRUCTURE AND MOTOR WITH REDUCTION GEAR

RELATED APPLICATIONS

The present application claims priority to Japanese Application Number 2016-174357, filed Sep. 7, 2016, the disclosure of which is hereby incorporated by reference herein in its entirety.

BACKGROUND

The present invention relates to a seal structure which seals between a cover for closing an opening of a case for housing a part and the case, and a motor with a reduction gear to which the seal structure is applied.

There has typically been a device which seals a case with a built-in part by attaching a cover to the case. In this device, by interposing a sealing member such as a packing or an O-ring between the cover and the case, contamination of foreign matter and infiltration of moisture from the outside are prevented. For example, JP-A-2012-229724 discloses a motor with a reduction gear in which a packing is interposed between a gear housing portion (case) which houses the reduction gear for reducing rotation of a motor unit, and a cover for covering an opening of the gear housing portion. In this motor, after the packing (sealing member) is attached to an outer peripheral edge of the opening of the gear housing portion, the cover is attached to the case.

SUMMARY

Figure 6A:
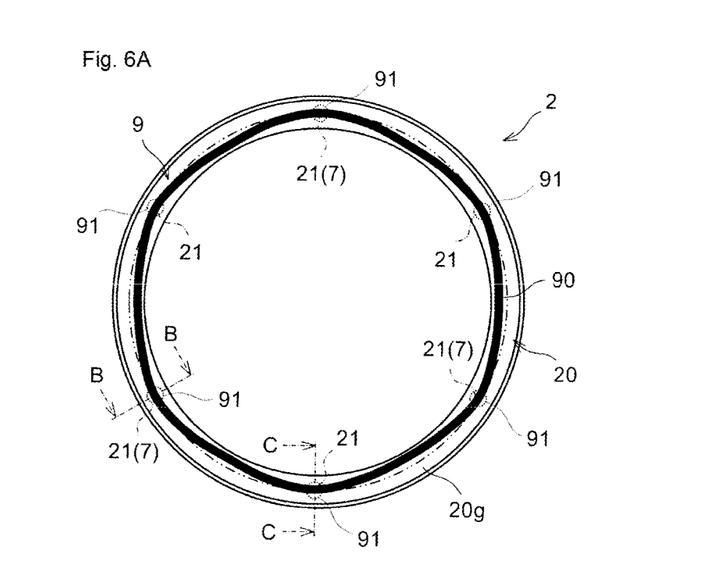
FIG. 6A is a view for describing a problem and is a plan view showing a back surface of the gear cover after forming a sealing member.

When a step of sealing between the case and the cover and assembling is automatically performed by an automatic machine, it is possible to handle the cover and the sealing member as one member instead of as separate members by integrating the cover and the sealing member to improve ease of assembly, and thus it is desirable to reduce the number of parts. As a method of integrating them, for example, a method of integrating the sealing member with the cover by outsert molding can be considered. An example of this method will be described with reference to FIGS. 6A to 6C. FIG. 6A is a plan view showing a rear surface of the cover after outsert molding, FIG. 6B is a cross-sectional view taken along line B-B of FIG. 6A during outsert molding, and FIG. 6C is a cross-sectional view taken along line C-C of FIG. 6A during outsert molding.

Figure 6B:
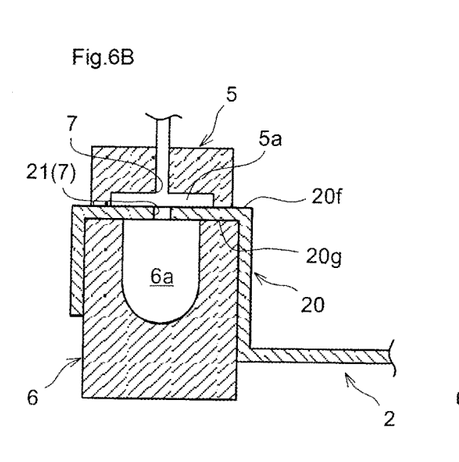
FIG. 6B is a view for describing the problem and is a cross-sectional view taken along line B-B of FIG. 6A at the time of forming the sealing member.
Figure 6C:
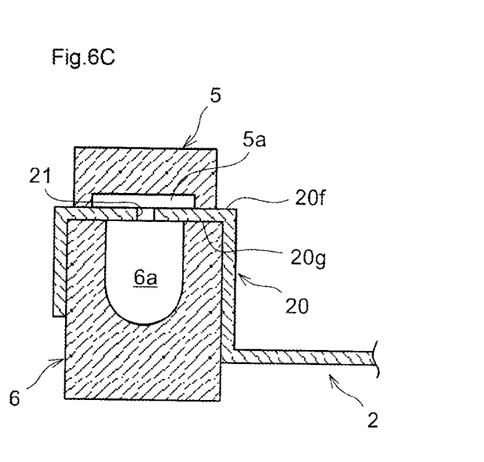
FIG. 6C is a view for describing the problem and is a cross-sectional view taken along line C-C of FIG. 6A at the time of forming the sealing member.

As shown in FIGS. 6A to 6C, a recessed portion 20 to cover a peripheral wall forming an opening of the case is provided on an outer periphery of a cover 2. A plurality of (six in the drawing) through-holes 21 is provided in a circumferential direction in the recessed portion 20. Several of the through-holes 21 (for example, three alternately) serve as gates 7 for injecting a resin. As shown in FIGS. 6B and 6C, an upper die 5 and a lower die 6 for forming a sealing member 9 are respectively arranged on an outer surface 20*f* and an inner surface 20*g* of the recessed portion 20 of the cover 2.

A disc-shaped cavity 5*a* (hereinafter referred to as a "first cavity 5*a*") having a larger diameter than the through-hole 21 is provided coaxially with each through-hole 21 in the upper die 5. An annular cavity 6*a* (hereinafter referred to as a "second cavity 6*a*") having a larger depth than the first cavity 5*a* and extending along a radial center (on a two-dot chain line in FIG. 6A) in the recessed portion 20 is provided in the lower die 6.

When the resin is supplied from each of the gates 7, as shown in FIG. 6B, the first cavity 5*a* continuous with the gate 7 is filled with the resin and the second cavity 6*a* is also filled with the resin through the through-hole 21. Furthermore, as shown in FIG. 6C, the first cavity 5*a* is also filled with the resin from the second cavity 6*a* through the through-hole 21 adjacent to the gate 7. The resin solidified in the first cavity 5*a* and the through-hole 21 serves as an anchor portion 91 for fixing the sealing member 9 to the cover 2. Meanwhile, the resin solidified in the second cavity 6*a* becomes a protruding portion (protrusion 90) to be pressed against the case.

In outsert molding, after the upper die 5 and the lower die 6 are filled with the resin, they are removed before the resin completely solidifies. Therefore, as shown in FIG. 6A, there is a problem that the resin with which the second cavity 6*a* is filled (that is, the protrusion 90) is unstable in a radial position between adjacent anchor portions 91 and is distorted in the circumferential direction. This is because the protrusion 90 tends to contract radially inward while the resin solidifies, whereas the radial position of the protrusion 90 is restricted only by the anchor portions 91. When the sealing member 9 is distorted in the circumferential direction, the sealing member 9 cannot be properly in close contact with a crimping surface provided on the case, and there is a concern that sealing performance is deteriorated. Such a problem can also occur when a sealing member is molded integrally with a cover which covers a case for housing a part other than motor-related parts (for example, the reduction gear described in JP-A-2012-229724 described above).

An embodiment of the present invention has been devised in view of such problems, and an object of the present invention is to improve sealing performance of a structure for sealing between a case and a cover by a sealing member. Another object of the present invention is to provide a motor with a reduction gear capable of automatically performing an assembly process of the case and the cover while improving the sealing performance. The embodiment of the present invention is not limited to these objects, and it is also another object of the present invention to obtain an operational effect which is derived from configurations shown in the embodiment for carrying out the disclosure described below but is not obtained by conventional techniques.

(1) A seal structure disclosed here is a structure which seals between a cover for closing an opening of a case for housing a part and the case by a sealing member, wherein the cover includes an annular recessed portion attached to an end of a peripheral wall forming the opening of the case and a plurality of through-holes penetrating a bottom portion of the recessed portion and spaced apart from each other in a circumferential direction, the sealing member is formed integrally with the cover, and integrally includes a protrusion protruding from the bottom portion over an entire circumference in the recessed portion and an anchor portion engaged with each of the through-holes to fix the sealing member to the cover, and a projecting portion for closing a gap between the protrusion and an inner wall of the recessed portion is provided between at least a plurality of the anchor portions in the recessed portion.

(2) The projecting portion is preferably provided integrally with the sealing member by outsert molding.

(3) The projecting portion is preferably provided over the entire circumference in the recessed portion.

(4) A protruding amount of the protrusion from the bottom portion is preferably set so that the protrusion is compressively deformed by the end of the peripheral wall in an attachment state of the case and the cover. In this case, the projecting portion is preferably set so that a height dimension from the bottom portion secures a space for allowing a compressive deformation amount of the protrusion to escape.

(5) The height dimension of the projecting portion is preferably not less than one third and not more than one half of the protruding amount of the protrusion.

(6) The cover preferably includes the six through-holes having a circular outer shape and arranged at equal intervals in the circumferential direction of the recessed portion. In this case, three through-holes alternately positioned among the six through-holes preferably have a function as a gate.

(7) An abutting surface on which an end surface of the peripheral wall of the case abuts is preferably provided on an opposite side of the projecting portion with respect to the protrusion in the recessed portion.

(8) A motor with a reduction gear, which is disclosed here includes: a motor unit provided with a rotor and a stator; and a reduction mechanism provided with a worm to which rotation of the motor unit is transmitted and a worm wheel meshing with the worm, wherein the seal structure according to any one of the above (1) to (7) is applied to a sealing portion between a gear case for housing the reduction mechanism and a gear cover attached to the gear case.

According to the disclosed seal structure, since the projecting portion for closing the gap between the protrusion and the inner wall of the recessed portion is provided at least between the anchor portions, it is possible to stabilize a radial position of the protrusion between the adjacent anchor portions. Thus, it is possible to prevent distortion of the protrusion in the circumferential direction, thereby improving the sealing performance.

In addition, according to the disclosed motor with a reduction gear, it is possible to improve the sealing performance. Furthermore, since the number of parts is reduced by integrating the cover and the sealing member, it is possible to improve ease of assembly by the automatic machine.

DETAILED DESCRIPTION

With reference to the drawings, a seal structure according to an embodiment will be described with an example applied to a motor with a reduction gear. The following embodiment is merely an example, and it is not intended to exclude application of techniques and various modifications not explicitly described in the following embodiment. Configurations of the present embodiment can be implemented with various modifications without departing from the spirits and scope of the invention. In addition, the configurations can be selected as required or can be combined appropriately.

1. Configuration 1-1. Motor with Reduction Gear

Figure 1:
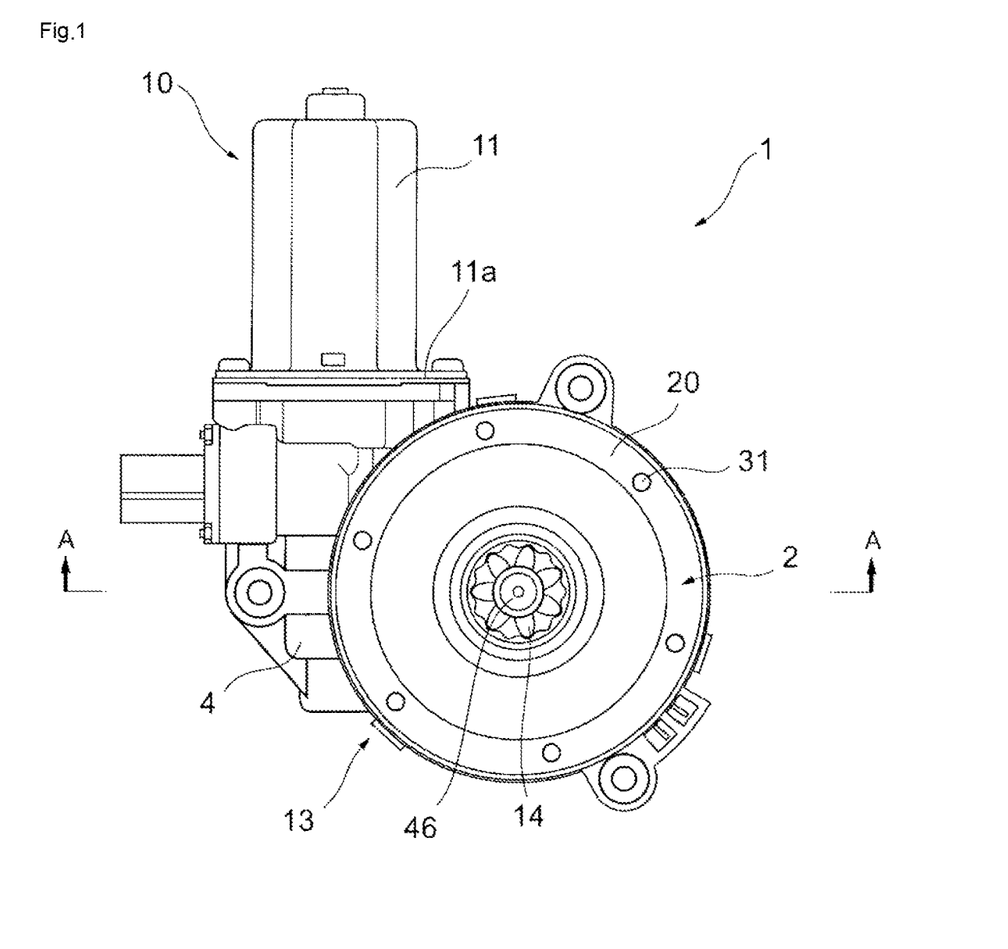
FIG. 1 is a plan view of a motor with a reduction gear according to an embodiment.
Figure 2:
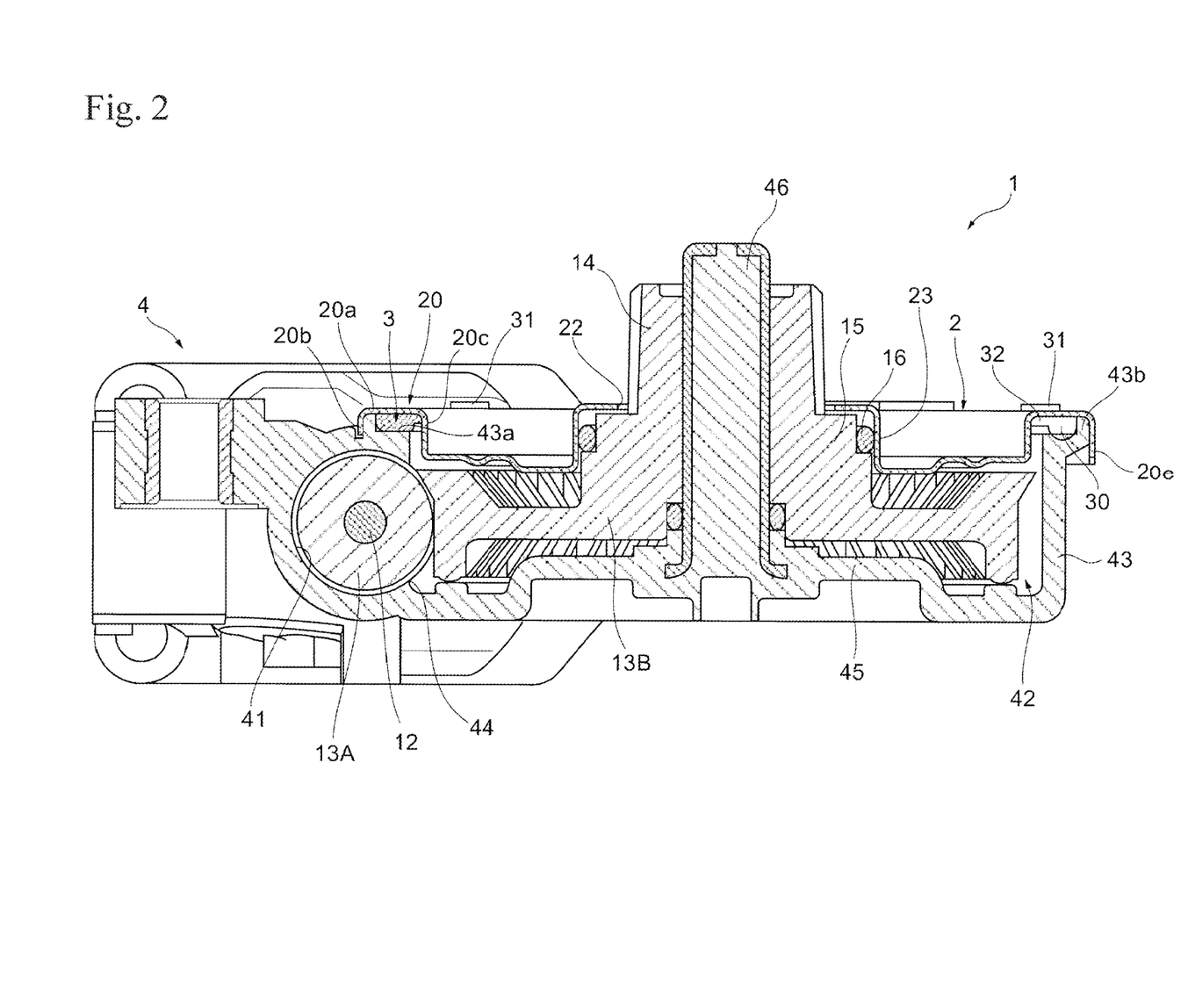
FIG. 2 is a cross-sectional view taken along line A-A of FIG. 1.

FIG. 1 is a plan view of a motor 1 with a reduction gear (hereinafter referred to as a "motor 1") according to the present embodiment, and FIG. 2 is a cross-sectional view taken along line A-A of FIG. 1. In the present embodiment, the motor 1 applied to a power window system of a vehicle will be exemplified. As shown in FIGS. 1 and 2, the motor 1 includes a motor unit 10 for generating an output, and a reduction mechanism 13 for reducing rotation of the motor unit 10.

The motor unit 10 is, for example, a DC motor with a brush, and has a rotor and a stator (neither of them are shown) built in a housing 11. One end of a shaft 12 of the motor unit 10 is pivotally supported by the housing 11, and the other end thereof extends into a gear case 4 coupled to the housing 11. The housing 11 has a bottomed tubular shape and is coupled to the gear case 4 by fastening a flange 11a provided around an opening (not shown) to a fastening portion 47 (see FIG. 3) of the gear case 4.

The gear case 4 (case) is a casing for housing the reduction mechanism 13 (part), and has two housing portions 41 and 42. The reduction mechanism 13 has a worm 13A to which the rotation of the motor unit 10 is transmitted and a worm wheel 13B having teeth meshing with the worm 13A. The worm 13A is a gear which is fixed to the other end of the shaft 12 and rotates along with the shaft 12. The worm wheel 13B is a gear which meshes with the worm 13A.

An output gear 14 is integrally provided in the worm wheel 13B of the present embodiment. The output gear 14 meshes with a gear provided in a driven member (not shown) to drive the driven member, and is disposed coaxially with the worm wheel 13B. An example of the driven member is a window regulator. The motor 1 reduces rotation of the shaft 12 by the reduction mechanism 13 to amplify the output of the motor unit 10, and output an amplified rotational driving force from the output gear 14. In the motor 1 of the present embodiment, a stepped portion 15 is provided between, and integrally with, the worm wheel 13B and the output gear 14. An O-ring 16 is attached to the stepped portion 15. The structure of the motor 1 is an example, and the worm wheel 13B and the output gear 14 may be provided separately.

Figure 3:
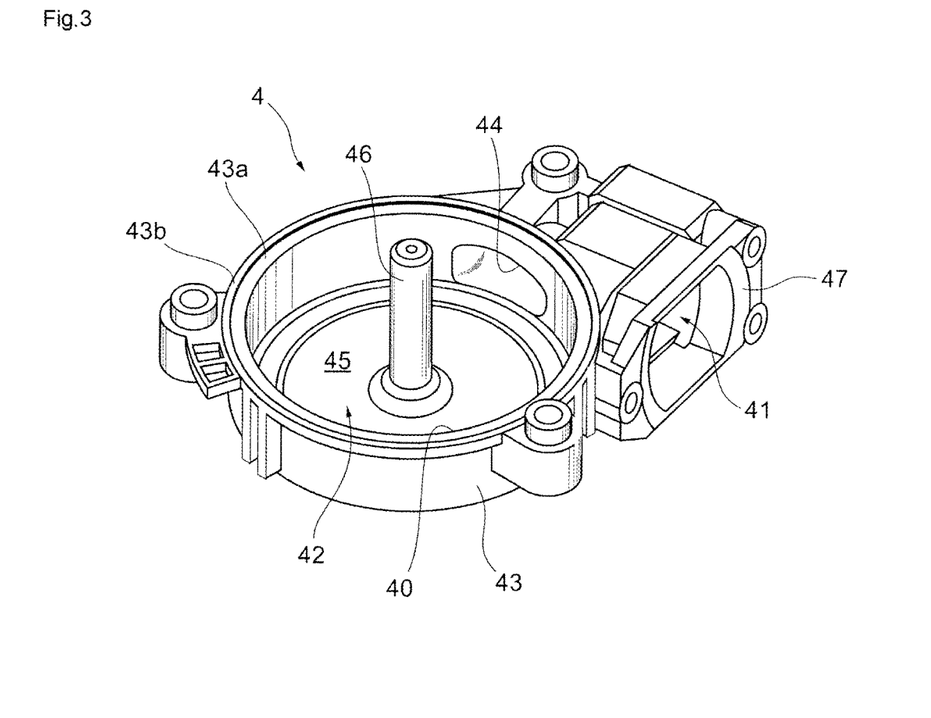
FIG. 3 is a perspective view of a gear case of the motor shown in FIG. 1 as viewed from an opening side of the gear case.

The worm 13A is housed in one housing portion 41 of the gear case 4, and the worm wheel 13B is housed in the other housing portion 42. Hereinafter, the former is referred to as a first housing portion 41, and the latter is referred to as a second housing portion 42. As shown in FIGS. 1 to 3, the second housing portion 42 has a bottomed cylindrical shape, and a circular opening 40 is formed by a peripheral wall 43. The first housing portion 41 is disposed adjacent to an outer side of the peripheral wall 43 of the second housing portion 42.

The first housing portion 41 and the second housing portion 42 communicate with each other through a communication port 44 penetrating a part of the peripheral wall 43 of the second housing portion 42. The communication port 44 is a hole for allowing a part of the worm 13A to protrude into the second housing portion 42, and the worm 13A and teeth of the worm wheel 13B mesh with each other in the second housing portion 42 by the communication port 44. A support shaft 46 having a height higher than that of the peripheral wall 43 is erected on a lower surface portion 45 of the second housing portion 42. The worm wheel 13B and the output gear 14 are rotatably supported by the support shaft 46.

Figure 4:
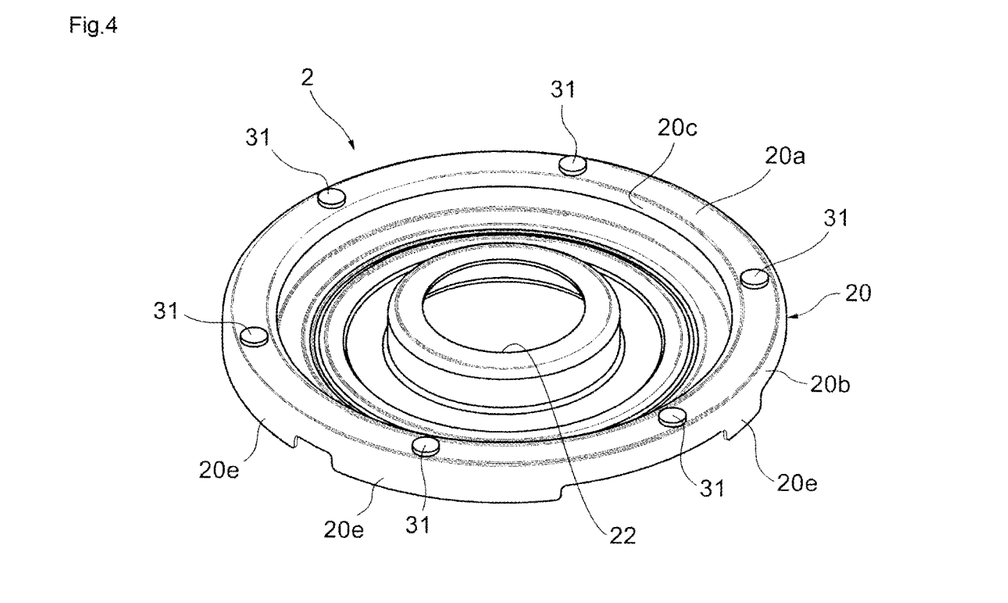
FIG. 4 is a perspective view of a gear cover attached to the gear case shown in FIG. 3.

A gear cover 2 (cover) integrally formed with a packing 3 (sealing member) is attached to the opening 40 of the gear case 4. As shown in FIG. 4, the gear cover 2 has a circular outer shape, and is bent so that a central portion and an outer peripheral portion of the gear cover 2 are higher than a radially intermediate portion thereof. A circular output hole 22 penetrates the central portion of the gear cover 2, and a cylindrical vertical wall 23 having an inner diameter larger than a diameter of the output hole 22 is erected at the central portion of the gear cover 2. The output hole 22 is an opening for allowing the support shaft 46 and the output gear 14 to protrude to the outside. The vertical wall 23 is a portion for sandwiching the O-ring 16 between the vertical wall 23 and the stepped portion 15 to seal the central portion of the gear cover 2.

A recessed portion 20 attached to the peripheral wall 43 is provided on the outer peripheral portion of the gear cover 2. The recessed portion 20 is an annular portion provided with the packing 3 for sealing the outer peripheral portion of the gear cover 2. Hereinafter, the seal structure of the second housing portion 42 of the gear case 4 and the outer peripheral portion of the gear cover 2 will be described in detail. In the following description, a distal end side of the support shaft 46 will be referred to as an upper side, and an opposite side (side of the lower surface 45) will be referred to as a lower side.

1-2. Seal Structure

Figure 5:
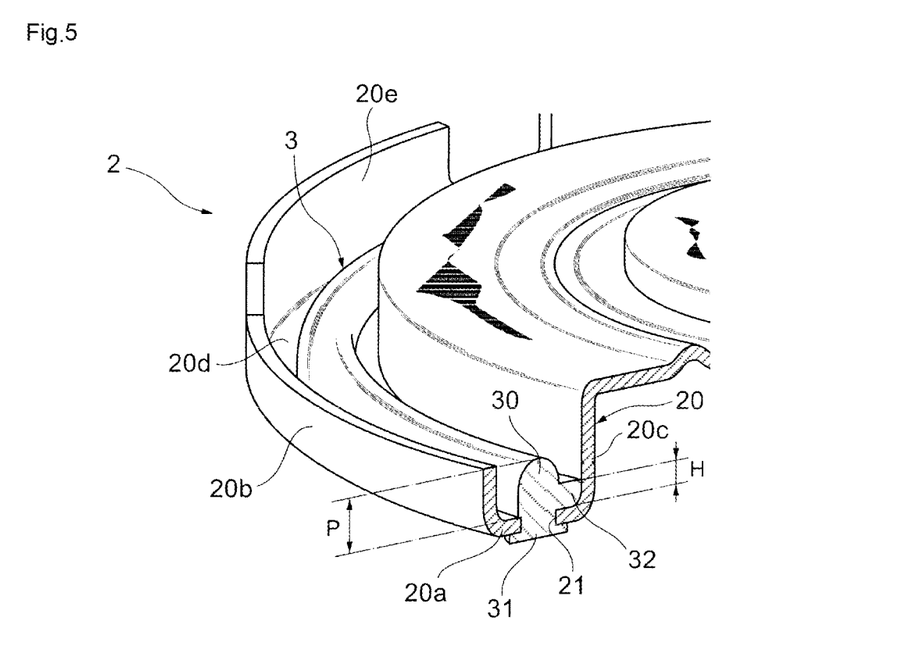
FIG. 5 is an enlarged cross-sectional perspective view showing a part of a back surface of the gear cover shown in FIG. 4.

FIG. 5 is an enlarged cross-sectional perspective view showing a part of a back surface of the gear cover 2 shown in FIG. 4. As shown in FIGS. 2 and 5, the recessed portion 20 of the gear cover 2 is formed to have a substantially U-shaped radial cross-section opened downward. The recessed portion 20 is formed by an annular bottom portion 20a, a cylindrical outer wall 20b, and a cylindrical inner wall 20c.

As shown in FIG. 2, in a state in which the gear cover 2 is attached to the gear case 4 (hereinafter referred to as an "attachment state"), the bottom portion 20a is positioned above the outer wall 20b and the inner wall 20c. The outer wall 20b is provided with a portion having a short axial length and a portion having a long axial length. The gear cover 2 is fixed to the gear case 4 by caulking a lower end 20e of the portion of the outer wall 20b having a long axial length.

As shown in FIGS. 2 and 3, an end of the peripheral wall 43 is formed to be thick so that only an outer diameter thereof is slightly larger. At this end, there are provided a planar crimping surface 43a facing upward and an end wall 43b rising upward from a radially outer end of the crimping surface 43a. The crimping surface 43a is a surface to which the packing 3 is crimped, and the end wall 43b is a portion which abuts the recessed portion 20 of the gear cover 2 and determines axial positions of the gear cover 2 and the gear case 4.

The packing 3 of the present embodiment is formed in the recessed portion 20 by outsert molding. As shown in FIG. 5, the gear cover 2 has a plurality of through-holes 21 penetrating the bottom portion 20a, and at least one through-hole 21 serves as a gate when a resin is injected. The through-holes 21 are spaced apart from each other in a circumferential direction. The gear cover 2 of the present embodiment has six through-holes 21 arranged at equal intervals in the circumferential direction of the recessed portion 20, and three through-holes 21 alternately positioned among these through-holes 21 serve as the gate.

The packing 3 of the present embodiment integrally includes a protrusion 30 for sealing between the packing 3 and the gear case 4, an anchor portion 31 for fixing the packing 3 to the gear cover 2, and a projecting portion 32 for defining a radial position of the protrusion 30. The protrusion 30 is a portion projecting from the bottom portion 20a over an entire circumference in the recessed portion 20, and a radial cross-sectional shape at a distal end of the protrusion 30 is formed in a substantially semicircular shape. A protruding amount P from the bottom portion 20a is set so that the protrusion 30 is compressively deformed by the end of the peripheral wall 43 in the attachment state. That is, the protruding amount P is set so that the distal end of the protrusion 30 and the end of the peripheral wall 43 overlap each other in the attachment state, like the packing 3 which neglects compressive deformation located on a right side of FIG. 2. The packing 3 in the attachment state is pressed against the crimping surface 43a of the peripheral wall 43 and deformed, as actually shown on a left side of FIG. 2.

As shown in FIG. 5, the anchor portion 31 is engaged with each of the plurality of through-holes 21, and is formed to have a T-shaped radial cross-sectional shape. The anchor portion 31 of the present embodiment includes a disc-shaped resin solidified on an upper surface (outer surface) of the bottom portion 20a, and a resin solidified in the through-hole 21. That is, the through-hole 21 (not shown) is formed at each position of six anchor portions 31 shown in FIG. 4. A diameter of the disc-shaped resin is larger than that of the through-hole 21.

As shown in FIG. 5, the projecting portion 32 closes a gap between the protrusion 30 and the inner wall 20c of the recessed portion 20, and is provided between at least the anchor portions 31 in the recessed portion 20. As described above, in the outsert molding, when the die is filled with the resin and then the die is removed before the resin is completely solidified, the resin to be the protrusion 30 tends to contract radially inward. The projecting portion 32 is a portion for resisting such a contraction force and is for preventing the radial position of the protrusion 30 from deviating from its original position. The projecting portion 32 of the present embodiment is provided over the entire circumference in the recessed portion 20 like the protrusion 30, and is in close contact with inner surfaces of the bottom portion 20a and the inner wall 20c.

A height dimension H (length in a vertical direction from the bottom portion 20a) of the projecting portion 32 is set to secure a space for allowing a compressive deformation amount of the protrusion 30 to escape. As shown on the left side of FIG. 2, in the packing 3 in the attachment state, the protrusion 30 is crimped to the crimping surface 43a to be compressed and deformed. Then, as shown on the right side of FIG. 2, since a volume (compressive deformation amount) corresponding to a portion, in which the distal end of the protrusion 30 and the end of the peripheral wall 43 overlap, radially inwardly escapes, a space which does not prevent this escape is necessary on a radially inner side of the protrusion 30. Therefore, as described above, the height dimension H of the projecting portion 32 is set in consideration of compressive deformation of the protrusion 30 in the attachment state. When the height dimension H of the projecting portion 32 is too small, rigidity thereof can be insufficient. Therefore, the height dimension H is set to not less than one third and not more than one half of the protruding amount P of the protrusion 30. More preferably, as shown in FIG. 5, the height dimension H is set to about half of the protruding amount P.

Between the protrusion 30 and the outer wall 20b of the recessed portion 20, a gap in which the end wall 43b of the peripheral wall 43 is fitted is provided. In other words, on an opposite side (radially outer side) of the projecting portion 32 with respect to the protrusion 30 in the recessed portion 20, there is provided an abutting surface 20d on which an end surface of the peripheral wall 43 abuts. The abutting surface 20d is a portion positioned radially outward of the protrusion 30 in the inner surface of the bottom portion 20a. By abutting the end surface of the peripheral wall 43 of the gear case 4 on the abutting surface 20d, the axial positions of the gear case 4 and the gear cover 2 are determined. Furthermore, by fitting the end wall 43b into the gap, the radial position of the gear cover 2 is also determined.

2. Effect (1) According to the seal structure described above, since the projecting portion 32 for closing the gap between the protrusion 30 and the inner wall 20c of the recessed portion 20 is provided at least between the anchor portions 31, the radial position of the protrusion 30 between the adjacent anchor portions 31 can be stabilized. Thus, it is possible to prevent distortion of the protrusion 30 in the circumferential direction, thereby improving sealing performance.

(2) In the seal structure described above, the projecting portion 32 is provided as a part of the packing 3. That is, since the projecting portion 32 is provided integrally with the protrusion 30 and the anchor portion 31 by the outsert molding, the projecting portion 32 can be easily formed, and manufacturing cost can be reduced.

(3) Since the projecting portion 32 is provided over the entire circumference in the recessed portion 20, the radial position of the packing 3 can be more stabilized, and the sealing performance can be further improved.

(4) Since the height dimension H from the bottom portion 20a is set to secure a space for allowing the compressive deformation amount of the protrusion 30 to escape, the above-described projecting portion 32 does not prevent the protrusion 30 in the attachment state from escaping. Therefore, it is possible to improve the sealing performance while defining the radial position of the protrusion 30.

(5) When the height dimension H of the projecting portion 32 is not less than one third of the protruding amount P of the protrusion 30, the rigidity of the projecting portion 32 can be ensured and the radial position of the protrusion 30 can be defined. Furthermore, when the height dimension H is not more than one half of the protruding amount P, an escape space of the protrusion 30 can be reliably secured.

(6) As described above, when the outer shape of the gear cover 2 is circular, the six through-holes 21 (that is, the anchor portions 31) are arranged at equal intervals in the circumferential direction, so that the packing 3 can be reliably fixed to the gear cover 2. Furthermore, by using the three through-holes 21 alternately positioned among the six through-holes 21 as gates, it is possible to improve both resin flowability and yield (to minimize an amount of resin solidified in a passage such as a spool or runner). Thus, it is possible to reduce the manufacturing cost while improving quality of the packing 3.

(7) In the seal structure described above, since the abutting surface 20d on which the end surface of the peripheral wall 43 abuts is provided on the opposite side of the projecting portion 32 with respect to the protrusion 30 in the recessed portion 20, the axial position of the gear cover 2 with respect to the gear case 4 can be determined. By fitting the end wall 43b of the peripheral wall 43 into the gap between the protrusion 30 and the outer wall 20b of the recessed portion 20, the radial position of the gear cover 2 with respect to the gear case 4 can also be determined.

(8) In the above-described motor 1, since the seal structure described above is applied to a sealing portion between the gear cover 2 and the gear case 4 for housing the reduction mechanism 13, the sealing performance can be improved. Furthermore, by integrating the gear cover 2 and the packing 3, it is possible to handle them as one member instead of as separate members, thereby reducing the number of parts. Thus, it is possible to improve ease of assembly when the motor 1 is automatically assembled by an automatic machine. Furthermore, compared to a case where the packing is separately provided, the above-described seal structure eliminates the possibility of misalignment at the time of assembling the packing, so that quality of the motor 1 can also be improved.

3. Others

The seal structure described in the above embodiment is an example and is not limited to the above-described one. For example, the above-described projecting portion 32 only has to be provided at least between adjacent anchor portions 31, and may not be provided over the entire circumference. In addition, the projecting portion 32 only has to close the gap between the protrusion 30 and the inner wall 20c of the recessed portion 20, and may be provided separately from the packing 3. When the projecting portion is provided separately from the packing 3, the projecting portion may be formed of a material different from that of the packing 3. Alternatively, by devising the shape of the gear cover 2, the projecting portion may be formed integrally with the gear cover 2. The height dimension H of the projecting portion 32 can be appropriately set.

A specific shape of the packing 3 is not limited to the above-described one, and for example, the distal end of the protrusion 30 may not be semicircular. In addition, the anchor portion 31 is not limited to the above-described shape as long as it has a shape engaged with the through-hole 21 to fix the packing 3 to the gear cover 2. Furthermore, a specific shape of the gear cover 2 is not limited to the above-mentioned one. For example, the number of the through-holes 21 (anchor portions 31) and the number of the gates are not limited to those described above, and can be appropriately set. Furthermore, the outer shape of the gear cover 2 can be appropriately changed according to the shape of the opening 40 of the gear case 4. Furthermore, the method of fixing the gear cover 2 to the gear case 4 is not limited to the caulking.

In the above embodiment, the seal structure applied to the sealing portion between the gear case 4 for housing the reduction mechanism 13 of the motor 1 and the gear cover 2 has been described; however, the above-described seal structure may be applied to a sealing portion other than this sealing portion. For example, the seal structure described above may be applied to a motor which does not include the reduction mechanism 13. That is, in a sealing portion between a housing (case) for housing a rotor and a stator, and an end bell (cover) for closing an opening of the housing, a recessed portion and a through-hole may be provided in the end bell, a sealing member having a protrusion and an anchor portion may be provided integrally with the end bell, and further a seal structure including a projecting portion may be formed. Furthermore, the above-described seal structure may be applied to a sealing portion between a case for housing a part other than motor-related parts and a cover for closing an opening of the case.

What is claimed is:

1. A seal structure which seals between a cover for closing an opening of a case for housing a part and the case by a sealing member, wherein
    the cover comprises an annular recessed portion attached to an end of a peripheral wall forming the opening of the case, and a plurality of through-holes penetrating a bottom portion of the recessed portion and spaced apart from each other in a circumferential direction,
    the sealing member is formed integrally with the cover, and integrally comprises a protrusion protruding from the bottom portion over an entire circumference in the recessed portion and an anchor portion engaged with each of the through-holes to fix the sealing member to the cover,
    a projecting portion for closing a gap between the protrusion and an inner wall of the recessed portion is provided between at least a plurality of the anchor portions in the recessed portion, and
    an abutting surface on which an end surface of the peripheral wall of the case abuts is provided on an opposite side of the projecting portion with respect to the protrusion in the recessed portion.

2. The seal structure according to claim 1, wherein the projecting portion is provided integrally with the sealing member by outsert molding.

3. The seal structure according to claim 1, wherein the projecting portion is provided over the entire circumference in the recessed portion.

4. The seal structure according to claim 1, wherein
    a protruding amount of the protrusion from the bottom portion is set so that the protrusion is compressively deformed by the end of the peripheral wall in an attachment state of the case and the cover, and
    the projecting portion is set so that a height dimension from the bottom portion secures a space for allowing a compressive deformation amount of the protrusion to escape.

5. The seal structure according to claim 4, wherein the height dimension of the projecting portion is not less than one third and not more than one half of the protruding amount of the protrusion.

6. The seal structure according to claim 1, wherein the cover comprises the six through-holes having a circular outer shape and arranged at equal intervals in the circumferential direction of the recessed portion, and three through-holes alternately positioned among the six through-holes have a function as a gate.

7. A motor with a reduction gear, comprising:
    a motor unit provided with a rotor and a stator; and
    a reduction mechanism provided with a worm to which rotation of the motor unit is transmitted and a worm wheel meshing with the worm, wherein
    the seal structure according to claim 1 is applied to a sealing portion between a gear case for housing the reduction mechanism and a gear cover attached to the gear case.

* * * * *